(12) United States Patent
Igarashi et al.

(10) Patent No.: US 7,817,668 B2
(45) Date of Patent: Oct. 19, 2010

(54) COMMUNICATION TERMINAL DEVICE AND COMMUNICATIONS METHOD

(75) Inventors: Ken Igarashi, Yokohama (JP); Kentaro Saito, Tokyo (JP); Daisuke Ochi, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 1099 days.

(21) Appl. No.: 11/476,580

(22) Filed: Jun. 29, 2006

(65) Prior Publication Data

US 2007/0005787 A1 Jan. 4, 2007

(30) Foreign Application Priority Data

Jun. 29, 2005 (JP) .......................... P2005-190613

(51) Int. Cl.
*H04J 3/24* (2006.01)
(52) U.S. Cl. .................. 370/474; 370/394; 370/412
(58) Field of Classification Search ................ 370/474, 370/389, 471, 394, 412, 328; 709/231; 710/305
See application file for complete search history.

(56) References Cited

U.S. PATENT DOCUMENTS

| | | | |
|---|---|---|---|
| 7,230,921 B2 * | 6/2007 | Eriksson et al. ............. | 370/230 |
| 7,277,963 B2 * | 10/2007 | Dolson et al. ............... | 709/246 |
| 7,428,595 B2 * | 9/2008 | Deshpande ................. | 709/235 |
| 7,535,900 B2 * | 5/2009 | Shenoi ........................ | 370/389 |
| 7,567,562 B2 * | 7/2009 | Lee et al. .................... | 370/389 |

OTHER PUBLICATIONS

Hung-Yun Hsieh, et al., "A Transport Layer Approach for Achieving Aggregate Bandwidths on Multi-homed Mobile Hosts", ACM MOBICOM, Sep. 2002, 12 pages.
Ming Zhang, et al., "A Transport Layer Approach for Improving End-to-End Performance and Robustness Using Redundant paths", USENIX, Jun. 2004, pp. 1-14.
R. Stewart, et al., "Stream Control Transmission Protocol", Network Working Group, RFC2960, Oct. 2000, pp. 1-102.

* cited by examiner

*Primary Examiner*—Ricky Ngo
*Assistant Examiner*—Chandrahas Patel
(74) *Attorney, Agent, or Firm*—Oblon, Spivak, McClelland, Maier & Neustadt, L.L.P.

(57) ABSTRACT

A communication terminal device includes: a path information manager unit for managing TCP control information related to each of the plurality of paths; a transmission segment manager unit for storing segments generated by dividing data to be transmitted to the receiving terminal device; and a segment transmitter unit for extracting the segment from the transmission segment manager unit and transmitting the extracted segment to the receiving terminal device. The transmission segment manager unit makes a reservation for transmission of the segment based on the TCP control information, by storing the segment in association with a path used for the transmission of the segment, and the segment transmitter unit extracts the segment from the transmission segment manager unit and transmits the extracted segment to the receiving terminal device along the path associated with the segment.

13 Claims, 17 Drawing Sheets

FIG.4

TCP-CB(n)

- rtt
- t_timer
- t_seq
- cwnd
- ssthresh
- rcv_nxt
- snd_nxt
- rsv_num
- snd_num
- max_sack

FIG.6

TCP-CB(n)

- del_timer
- del_ack
- rcv_nxt
- p_sack1
- p_sack2
- p_sack3

COMMUNICATION TERMINAL DEVICE AND COMMUNICATIONS METHOD

CROSS REFERENCE TO RELATED APPLICATION

This application is based upon and claims the benefit of priority from the prior Japanese Patent Application No. P2005-190613, filed on Jun. 29, 2005; the entire contents of which are incorporated herein by reference.

BACKGROUND OF THE INVENTION

1. Field of the Invention

The present invention relates to a communications method in which a transmitting terminal device transmits data to a receiving terminal device by simultaneously using a plurality of paths, and relates to communication terminal devices which realize the communications method.

2. Description of the Related Art

Techniques cited in a Non-patent Document 1 (RFC2960, "Stream Control Transmission Protocol (SCTP)"), a Non-patent Document 2 ("A transport layer approach for improving end-to-end performance and robustness using redundant paths", Arvind Krishnamurthy, Larry Peterson, Ming Zhang, Junwen Lai, Randolph Wang, USENIX '04, pages 99-112, June 2004), and a Non-patent Document 3 ("A transport layer approach for achieving aggregate bandwidth on multi-homed mobile hosts", Hung-Yun Heleh, Raghupathy Sivakumar, ACM Mobicom '02, September 2002) are conventionally known as a communications method which uses a multi-home-capable Transport Protocol (for example, a Multi-Path Transmission Control Protocol (TCP)), that is, a communications method in which a transmitting terminal device transmits data to a receiving terminal device by simultaneously using a plurality of paths.

However, the communications method using the multi-home-capable Transport Protocol, which is proposed in the Non-patent Document 1, is configured to use only a single path which is in the best communications status in order to carry out communications and to use another path as an alternative path upon failure.

Therefore, there is a problem that it is not possible to carry out communications by simultaneously using a plurality of paths.

On the other hand, the techniques proposed in the Non-patent Documents 2 and 3 can carry out communications by simultaneously using a plurality of paths which exist between a transmitting terminal device and a receiving terminal device.

However, the technique proposed in the Non-patent Document 2 requires a new header over a normal TCP header. Thus, there is a problem that it is not possible to carry out communications with communication terminal devices without a protocol proposed in the Non-patent Document 2.

Regarding this point, the technique proposed in the Non-patent Document 3, is configured to realize communications by simultaneously using a plurality of paths existing between transmitting and receiving terminal devices by use of a normal header alone (that is, a multi-home connection).

However, the technique proposed in the Non-patent Document 3 can use only one path for transmitting a receipt acknowledgement signal of Acknowledgement (ACK) (an ACK path).

Therefore, if a failure occurs in the ACK path which is being used, all paths are influenced, and also each path becomes asymmetric (a path which transmits data is different from a path which receives an ACK for the data). Consequently, there is a problem that Round Trip Time (RTP) cannot be measured accurately.

Furthermore, the technique proposed in the Non-patent Document 3 has a problem that it is not possible to use a Cumulative ACK (C-ACK), and the like. In addition, there is a problem that it is not possible to perform control equivalent to a normal TCP by the path unit.

SUMMARY OF THE INVENTION

The present invention has been made in view of the above. An object of the present invention is therefore to provide a communications method and a communication terminal device, which realize a multi-home-capable Transport Protocol which can perform control similar to that of a normal TCP by improving the Cumulative ACK as well as by accurately measuring RTT by using symmetric paths by use of a plurality of ACK paths without using a header other than a normal TCP header, so as to allow communication with a receiving terminal device to which the present invention is applied.

A first aspect of the present invention is summarized as a communication terminal device capable of transmitting data to a receiving terminal device by simultaneously using a plurality of paths, including: a path information manager unit configured to manage TCP control information related to each of the plurality of paths; a transmission segment manager unit configured to store segments generated by dividing data to be transmitted to the receiving terminal device; and a segment transmitter unit configured to extract the segment from the transmission segment manager unit and to transmit the extracted segment to the receiving terminal device, wherein the transmission segment manager unit is configured to make a reservation for transmission of a segment based on the TCP control information, by storing the segment in association with a path used for the transmission of the segment, and the segment transmitter unit is configured to extract the segment from the transmission segment manager unit and to transmit the extracted segment to the receiving terminal device along the path associated with the segment.

In the first aspect, the communication terminal device can include: a segment receiver unit configured to delete, from the transmission segment manager unit, segments each having a sequence number smaller than the smallest sequence number among sequence numbers respectively representing segments which have not received a receipt acknowledgement signal in all the transmission segment manager units, when a receipt acknowledgement signal related to a segment is received along the same path as a path used for transmission of the segment.

In the first aspect, when a timeout is detected, the transmission segment manager unit can be configured to cancel reservations for transmission of all segments which have not received a receipt acknowledgement signal, and to make reservations again for the transmission of the segments based on the TCP control information.

In the first aspect, the transmission segment manager unit can be configured to cancel reservations for transmission of segments which have not received a receipt acknowledgement signal and which have a sequence number not larger than the largest sequence number among sequence numbers representing segments having received a selective receipt acknowledgement signal and segments which have not been transmitted, when there are a predetermined number of segments or more having not received a receipt acknowledgement signal between a segment which has received the selective receipt acknowledgement signal and which has the largest sequence number, and a segment which should receive a receipt acknowledgement signal next; and to make reservations again for the transmission of the segments based on the TCP control information.

In the first aspect, the segment transmitter unit can be configured to form an ad hoc network among itself and neighboring communication terminal devices, and to transmit the segment along the path in the ad hoc network.

A second aspect of the present invention is summarized as a communication terminal device capable of receiving data from a transmitting terminal device by simultaneously using a plurality of paths, including: a path information manager unit configured to manage TCP control information related to each of the plurality of paths; a segment receiver configured to receive, along the plurality of paths, segments which are generated by dividing the data; a receipt segment manager unit configured to store the received segments for each of the paths along which the segments have been transmitted; and a segment transmitter unit configured to transmit receipt acknowledgement signals respectively for notifying results of receiving the segments along the paths based on the TCP control information.

In the second aspect, the receipt acknowledgement signal can be configured to notify the sequence number of a segment which is successfully received along the path.

In the second aspect, when the plurality of segments whose sequence numbers are serial have been received along the same path, the receipt acknowledgement signal can be configured to collectively notify the results of receiving the plurality of segments.

In the second aspect, the segment receiver unit can be configured to form an ad hoc network among itself and neighboring communication terminal devices and to receive the segment along the paths in the ad hoc network.

A third aspect of the present invention is summarized as a communications method in which a transmitting terminal device transmits data to a receiving terminal device by simultaneously using a plurality of paths, including: making, at the transmitting terminal device, a reservation for transmission of each segments generated by dividing the data which should be transmitted to the receiving terminal device, by storing the each segments in association with a path used for the transmission of the each segments in a transmission segment manager unit, based on TCP control information managed for each of the plurality of paths; extracting, at the transmitting terminal device, a segment from the transmission segment manager unit, and transmitting the extracted segment to the receiving terminal device along a path associated with the segment; managing, at the receiving terminal device, a received segment in association with the path along which the segment have been transmitted, and transmitting a receipt acknowledgement signal for notifying a result of receiving the segment along the path based on TCP control information managed for each of the plurality of paths; and deleting, at the transmitting terminal device, the segment and the path associated with the segment from the transmission segment manager unit, when the receipt acknowledgement signal related to the segment have been received along the same path as a path used for the transmission of the segment.

In the third aspect, the communications method can further include: forming, at the transmission and receiving terminal devices, an ad hoc network among themselves and neighboring communication terminal devices, wherein the transmitting terminal device can transmit the generated segments to the receiving terminal device along the paths in the ad hoc network, and the receiving terminal device can receive the segments along the paths in the ad hoc network.

BRIEF DESCRIPTION OF THE DRAWINGS

FIG. 4 is a diagram showing an example of management contents of a path information manager unit of the communication terminal device (the transmitting terminal device) according to the first embodiment of the present invention.

FIG. 6 is a diagram showing an example of management contents of a path information manager unit of the communication terminal device (the receiving terminal device) according to the first embodiment of the present invention.

DESCRIPTION OF THE PREFERRED EMBODIMENTS

Figure 1:
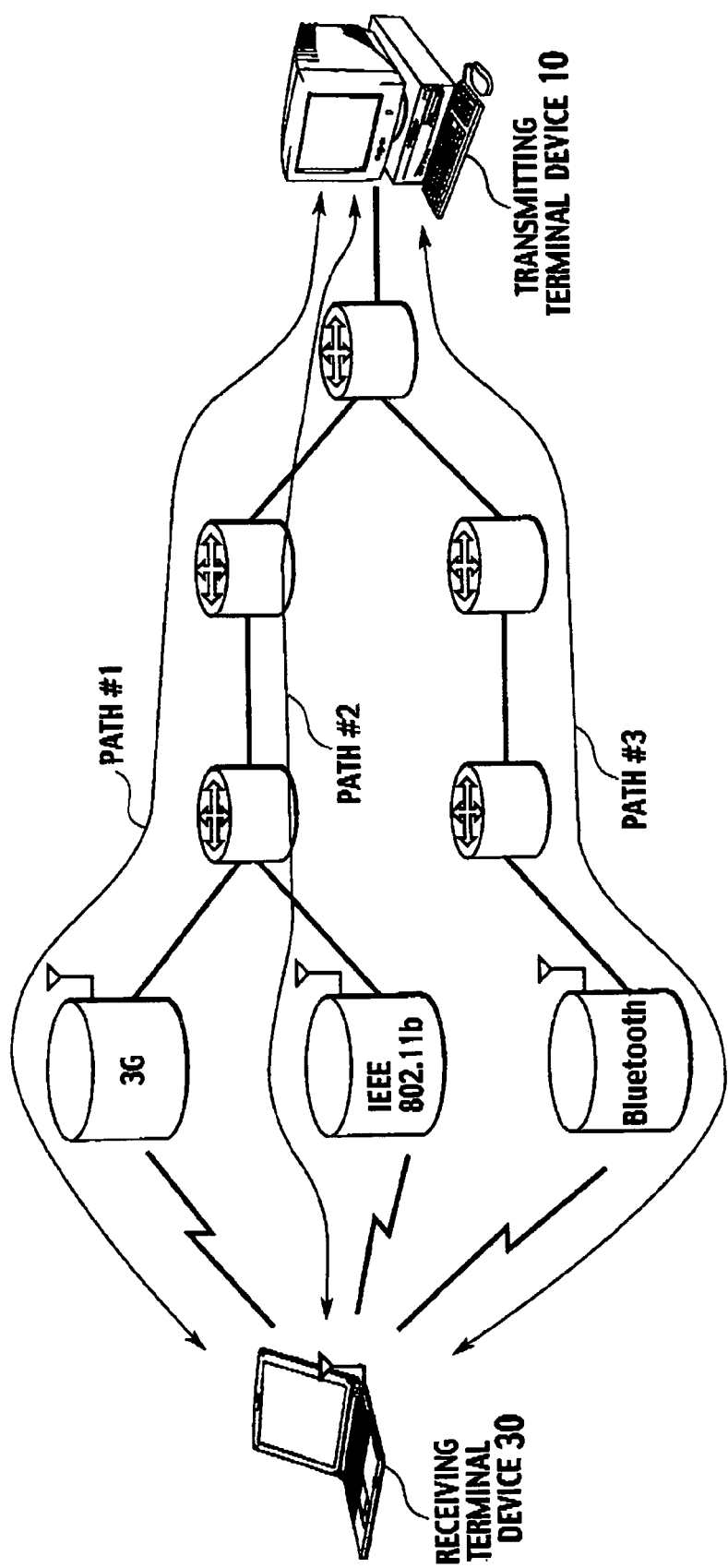
FIG. 1 is an entire configuration diagram of a communications system which includes communication terminal devices according to a first embodiment of the present invention.

Configuration of Communication Terminal Devices According to First Embodiment of Present Invention FIG. 1 shows an example of a communications system which includes communication terminal devices (a transmitting terminal device 10 and a receiving terminal device 30) according to a first embodiment of the present invention.

As shown in FIG. 1, in this embodiment, assumed is the environment where data is transmitted from the transmitting terminal device 10 to the receiving terminal device 30 by simultaneously using three paths #1 to #3.

As the data, application data used for various protocols such as FTP (File Transfer Protocol), SMTP (Simple Mail Transfer Protocol), HTTP (Hyper Text Transfer Protocol), POP3 (Post Office Protocol Version 3) and the like is assumed.

Also, the above mentioned data can be applied in database languages such as an SQL (Structured Query Language) and the like, in a file access performed beyond a network such as an NFS (Network File System) and the like, and in any type of communication using TCP such as an SSH (Secure Shell), an SSL (Secure Socket Layer), a VPN (Virtual Private Network) including "Ethernet over TCP/IP" and the like.

As shown in FIG. 1, the receiving terminal device 30 according to this embodiment is configured to include a plurality of wireless interfaces (to be capable of a multi-home connection) such as a 3G-capable interface in a wireless area network (WAN), an IEEE 802.11b-capable interface in a wireless local area network (WLAN), and a Bluetooth (a registered trademark)-capable interface in a wireless personal area network (WPAN).

Furthermore, the receiving terminal device 30 according to this embodiment is configured to receive data transmitted from the transmitting terminal device 10 by simultaneously using the plurality of paths #1 to #3 which are established by the plurality of interfaces.

On the other hand, in an example of FIG. 1, the transmitting terminal device 10 according to this embodiment simply has a wired interface, but does not have a plurality of wireless interfaces.

However, a path (a common TCP connection) is identified by use of four addresses of [(an IP address of a sender, a port number thereof), (an IP address of a receiver, a port number thereof)], in a normal TCP.

Therefore, the transmitting terminal device 10 according to this embodiment is also configured to be capable of identifying the above-mentioned paths #1 to #3 (to be capable of a multi-home connection), since the transmitting terminal device 10 is required to transmit (segments composing) data to the receiving terminal device 30 by simultaneously using the plurality of paths #1 to #3.

Figure 2:
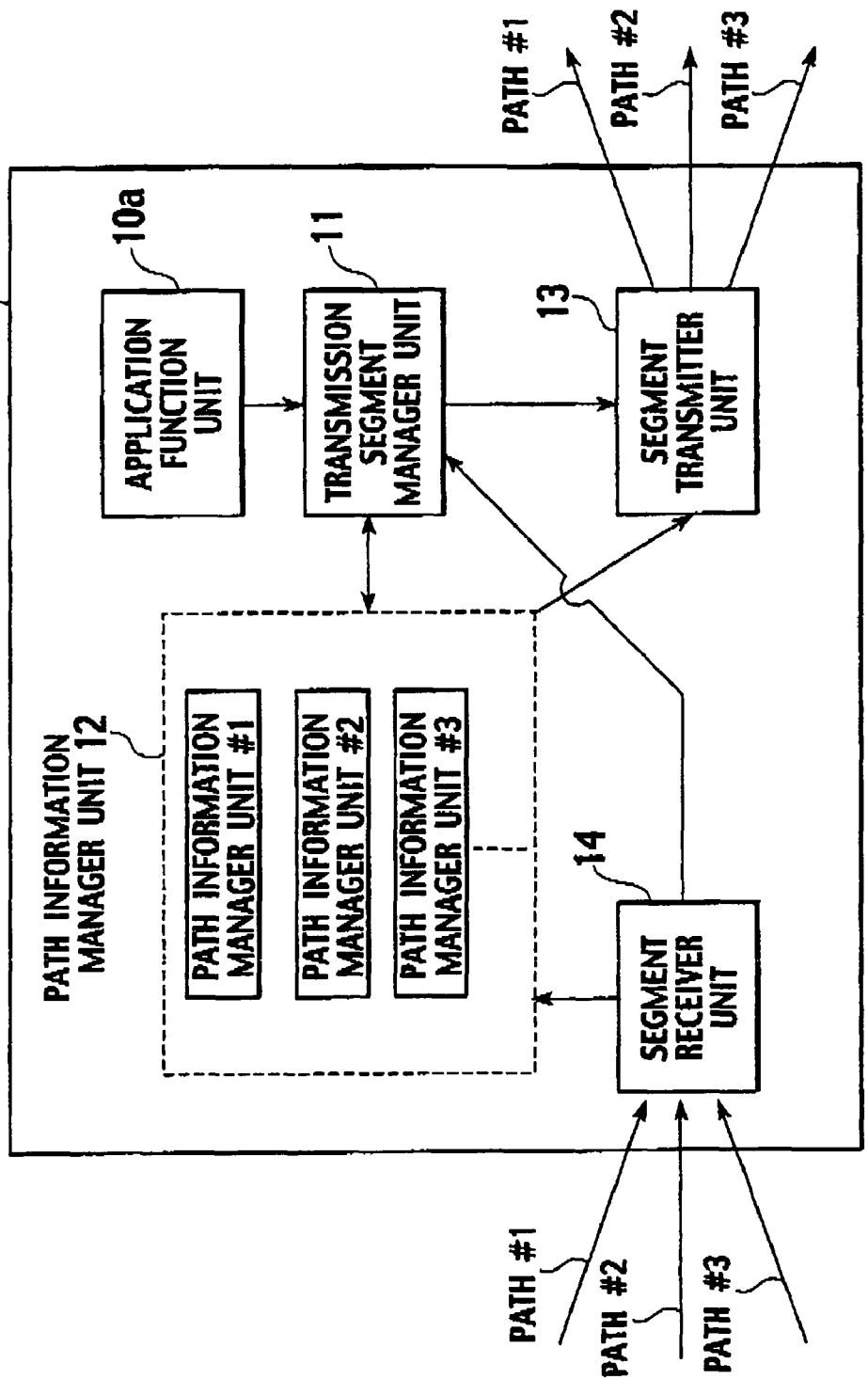
FIG. 2 is a functional block diagram of the communication terminal device (a transmitting terminal device) according to the first embodiment of the present invention.

As shown in FIG. 2, the transmitting terminal device 10 according to this embodiment includes an application function unit 10a, a transmission segment manager unit 11, a path information manger unit 12, a segment transmitter unit 13, and a segment receiver unit 14.

The application function unit 10a is configured to instruct the transmission segment manager unit 11 to transmit data used in an application.

Here, the application function unit 10a may be configured to be able to explicitly designate a set of a plurality of paths as paths for transmitting the data.

In addition, the application function unit 10a may be configured to designate a representative path as a path for transmitting data, and to add other paths automatically.

The transmission segment manager unit 11 is configured of a transmission buffer to store segments generated by dividing the data to be transmitted to the receiving terminal device 30.

Furthermore, the transmission segment manager unit 11 is configured to make a reservation for transmission of a generated segment, by storing the segment in association with a path (a variable "path") used for the transmission of the segment, based on TCP control information which is managed by a TCP Control Block (TCP-CB) for each paths.

Figure 3:
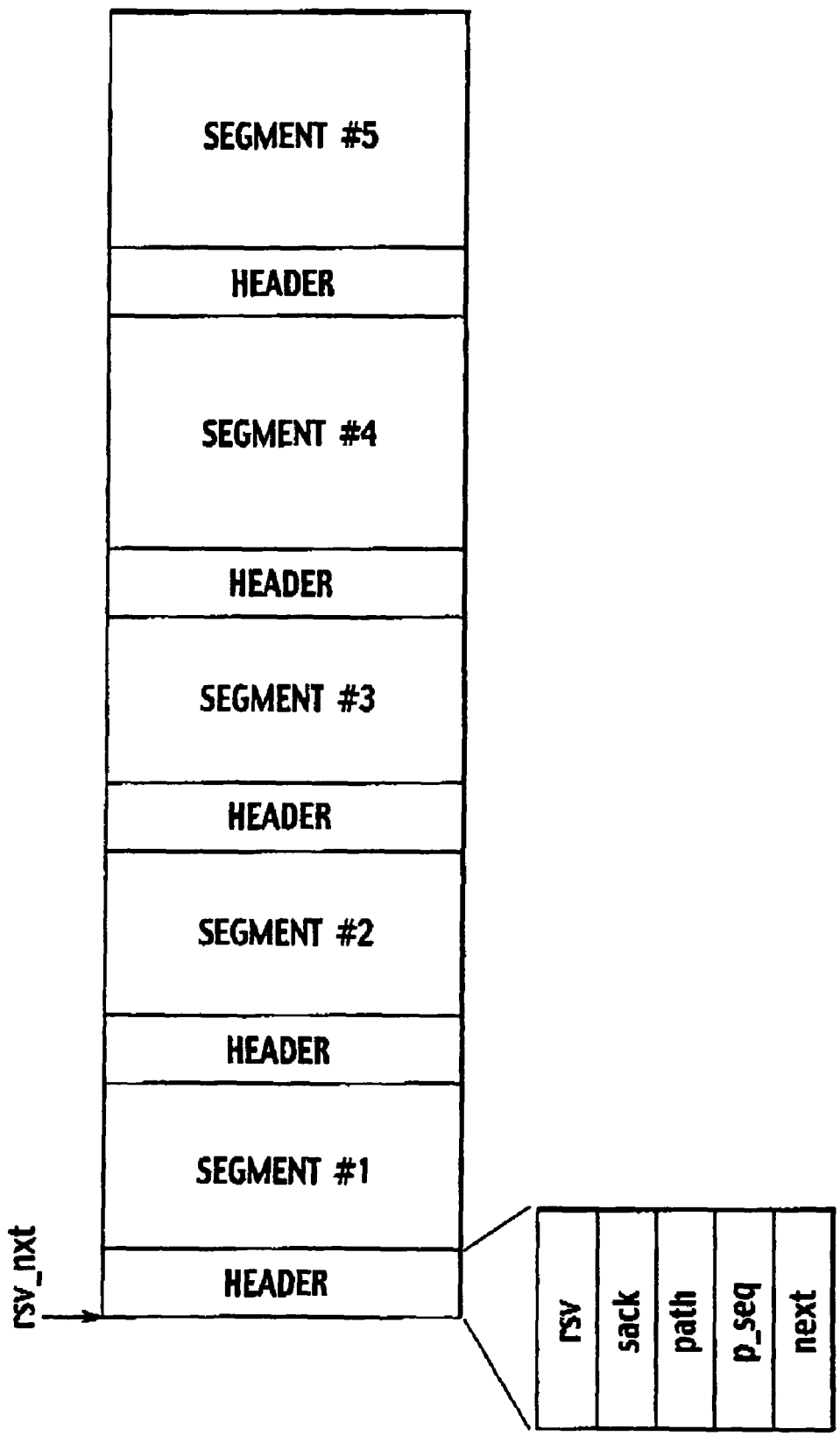
FIG. 3 is a diagram showing an example of management contents of a transmission segment manager unit of the communication terminal device (the transmitting terminal device) according to the first embodiment of the present invention.

Specifically, as shown in FIG. 3, the transmission segment manager unit 11 is configured to divide data which have been received from the application function unit 10a and which are going to be transmitted to the receiving terminal device 30, by the Protocol Data Unit (PDU), and to form segments by adding a normal TCP header to each of the divided data. Here, the TCP header is assumed to be a TCP header which is used in the normal TCP.

Moreover, the transmission segment manager unit 11 is configured to manage the formed segments by adding a special header for the management of the segment thereto.

As shown in FIG. 3, the special header is configured to include variables such as "path", "sack", "p_seq" and "next", and flags such as an "rsv" flag.

Here, the variable "p_seg" shows the sequence number of each of the segments, which are respectively assigned to the paths.

Note that although it is common in the TCP to express a sequence number in a "byte order", a sequence number in this embodiment is expressed in a "sequence order" for simplification.

Furthermore, the variable "path" indicates the identification information of a path used for the transmission of the segment, and the variable "sack" indicates the identification information of a path used for the receipt of an ACK to the segment. In addition, the variable "next" indicates a segment to be referred to after the segment.

The "rsv" flag is a flag to indicate a status in which a reservation is made for the transmission of the segment ("1" when in such a status).

Moreover, the transmission segment manager unit 11 is configured to manage a variable of "rsv_nxt" which indicates a data starting point to be reserved next.

Furthermore, when a timeout is detected, the transmission segment manager unit 11 is configured to cancel reservations for the transmission of all the segments which have not received an ACK (a receipt acknowledgement signal), respectively, and to make reservations again for the transmission of the segments based on TCP-CB (TCP control information).

Additionally, the transmission segment manager unit 11 is configured to cancel reservations for the transmission of segments which have not received an ACK (a receipt acknowledgement signal), and which have a sequence number not larger than the largest sequence number among sequence numbers representing segments having received an SACK block (a selective receipt acknowledgement signal) and segments which have not been transmitted, when there are a predetermined number (for example, three) of segments or more having not received the receipt acknowledgement signal between a segment which has received the selective receipt acknowledgement signal and which has the largest sequence number (a segment indicated by "max_sack"), and a segment which should receive a receipt acknowledgement signal next (a segment indicated by "rcv_next"), and to make reservations again for the transmission of the segments based on TCP control information (TCP-CB), The path information manager unit 12 is configured to manage TCP-CB (TCP control information) related to each of the plurality of paths #1 to #3, with a plurality of path information manager units #1 to #3.

Note that each path is identified by four addresses of [(an IP address of a sender, a port number thereof), (an IP address of a receiver, a port number thereof)].

Specifically, as shown in FIG. 4, each path information manager unit #n is configured to manage TCP-CB(n) including variables such as "rtt", "t_timer", "t_seq", "cwnd", "ssthresh", "rcv_nxt", "snd_nxt", "rsv_num", "snd_num", and "max_sack".

Note that various information for maintaining a TCP connection such as "t_state" and "t_flags" may be further secured for the TCP-CB (n).

Here, "rtt" indicates a measured round trip time, "t_timer" indicates a value for timeout calculated based on "rtt", "t_seq" indicates a sequence number of a segment used for calculating "rtt", "cwnd" indicates a congestion window, "ssthresh" indicates a Slow Start Threshold, "rcv_nxt" indicates a sequence number of a segment which is expected to be received next, "snd_nxt" indicates a sequence number of a segment to be transmitted next, "rsv_num" indicates a data amount of data which has been made a reservation for transmission, "snd_num" indicates a data amount of data which has been transmitted, and "max_sack" indicates the largest sequence number notified by an Ack or a SACK option in a segment transmitted along the path.

The segment transmitter unit 13 is configured to extract a segment from the transmission segment manager unit 11, and to transmit the extracted segment to the receiving terminal device 30 along a path associated with the segment.

Moreover, the segment transmitter unit 13 is configured to retransmit the segment when it is detected that a specific segment is lost.

The segment receiver unit 14 is configured to delete, from the transmission segment manager unit 11, a segment having a sequence number smaller than the smallest sequence number among segments which have not received an ACK (a receipt acknowledgement signal) in all the transmission segment manager units 11, when an ACK (a receipt acknowledgement signal) related to a segment is received along the same path as a path used for the transmission of the segment.

Figure 5:
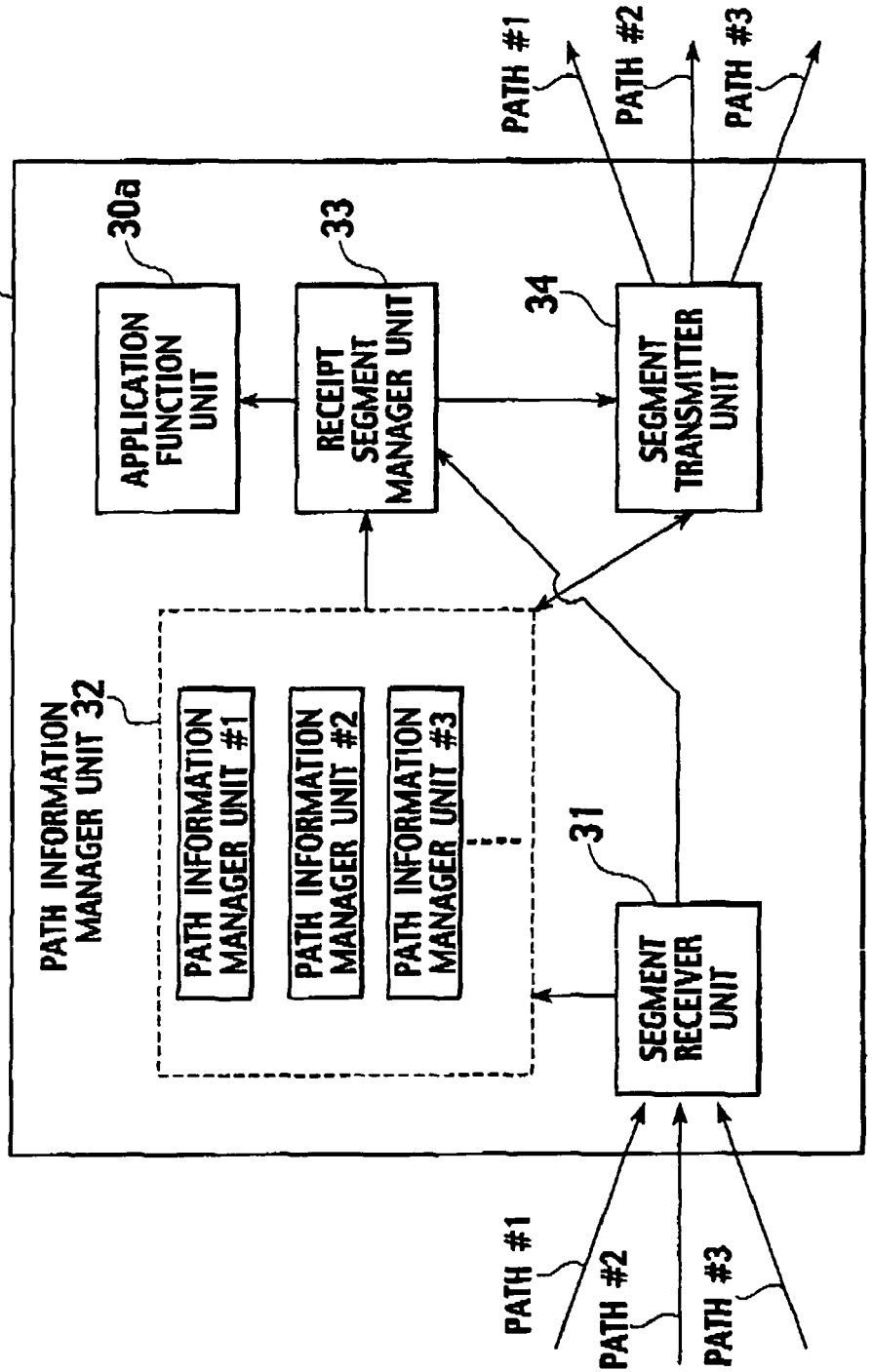
FIG. 5 is a functional block diagram of the communication terminal device (a receiving terminal device) according to the first embodiment of the present invention.

As shown in FIG. 5, the receiving terminal device 30 of this embodiment includes an application function unit 30a, a segment receiver unit 31, a path information manager unit 32, a receipt segment manager unit 33 and a segment transmitter unit 34.

The segment receiver unit 31 is configured to receive a segment from the transmitting terminal device 10 along the plurality of paths #1 to #3, and to transmit each of the received segments to specific path information manager units #1 to #3, based on four addresses of [(an IP address of a sender, a port number thereof), (an IP address of a receiver, a port number thereof)].

The path information manager unit 32 is configured to manage TCP-CB (TCP control information) related to each of the plurality of paths #1 to #3 by the plurality of path information manager units #1 to #3.

Note that each path is identified by four addresses [(an IP address of a sender, a port number thereof), (an IP address of a receiver, a port number thereof)].

Specifically, as shown in FIG. 6, each path information manager unit #n is configured to manage TCP-CB (n) including variables such as "del_timer", "del_ack", "rcv_nxt", "p_sack 1", "p_sack 2", and "p_sack 3".

Note that various information for maintaining a TCP connection may further be secured for applicable TCP-CB (n).

Here, "del_timer" indicates a timer for delaying transmission of an ACK, "del_ack" indicates a sequence number used for an ACK when "del_timer" is expired, "rcv_nxt" indicates a sequence number of a segment which is expected to be received next, and "p_sack n" indicates a sequence number to be used to the nth block.

The receipt segment manager unit 33 is configured to manage a received segment for each path along which the segment has been transmitted.

Figure 7:
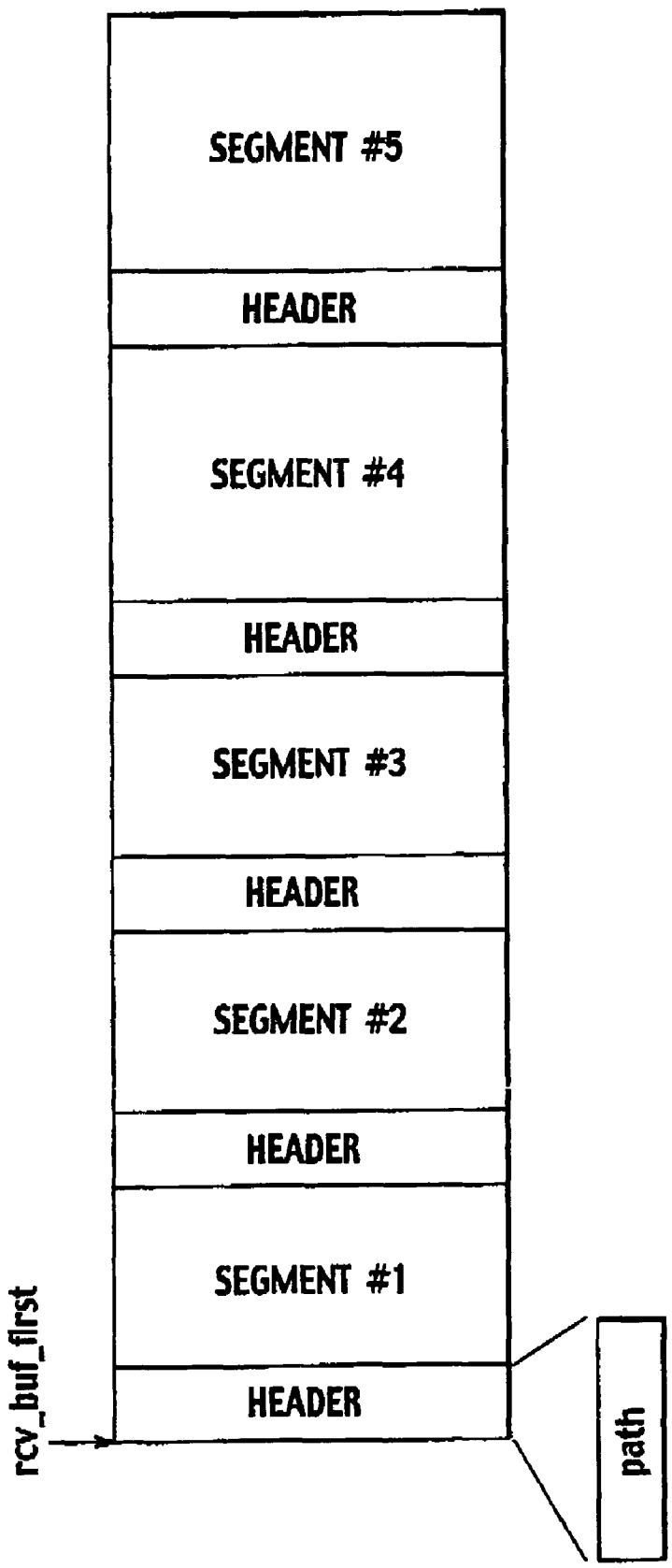
FIG. 7 is a diagram showing an example of the management contents of a receipt segment manager unit of the communication terminal device (the receiving terminal device) according to the first embodiment of the present invention.

Specifically, as shown in FIG. 7, the receipt segment manager unit 33 is a receiving buffer which is configured to manage each segment transmitted from the path information manager unit 12 by adding a special header for the management of the segment.

As shown in FIG. 7, the special header is configured to include variables such as "path".

Here, the variable "path" shows the identification information of a path used for the transmission of the segment.

Moreover, the receipt segment manager unit 33 is configured to manage a variable of "rcv_buf_first", which shows a starting point where a segment first-received is stored.

Incidentally, the receipt segment manager unit 33 is configured to perform transmission to the application function unit 30a, starting from a segment shown by the variable "rcv_buf_first".

The segment transmitter unit 34 is configured to transmit an ACK (a receipt acknowledgement signal) for notifying the receipt result of a segment along each path, based on TCP-CB (TCP control information) managed for each path.

Note that, as described later, the selective acknowledgement (SACK) option defined in RFC2018 is given to the ACK. Here, the SACK option given to the ACK is configured to notify the sequence number of a segment which is successful in the receipt via each path.

Furthermore, the segment transmitter unit 34 may be configured to transmit a receipt acknowledgement signal (C-ACK) which collectively notifies the results of receiving the plurality of segments when a plurality of segments whose sequence numbers are serial in the same path are received.

Operations of Communication Terminal Devices According to First Embodiment of Present Invention Hereinafter, with reference to FIGS. 8 to 15, descriptions will be given of the operations of the communication terminal devices according to the first embodiment of the present invention.

Firstly, with reference to FIGS. 8 and 9, descriptions will be given of the operations in which the transmission terminal device 10 according to this embodiment transmits data to the receiving terminal device 30 by simultaneously using the plurality of paths #1 to #3.

Figure 8:
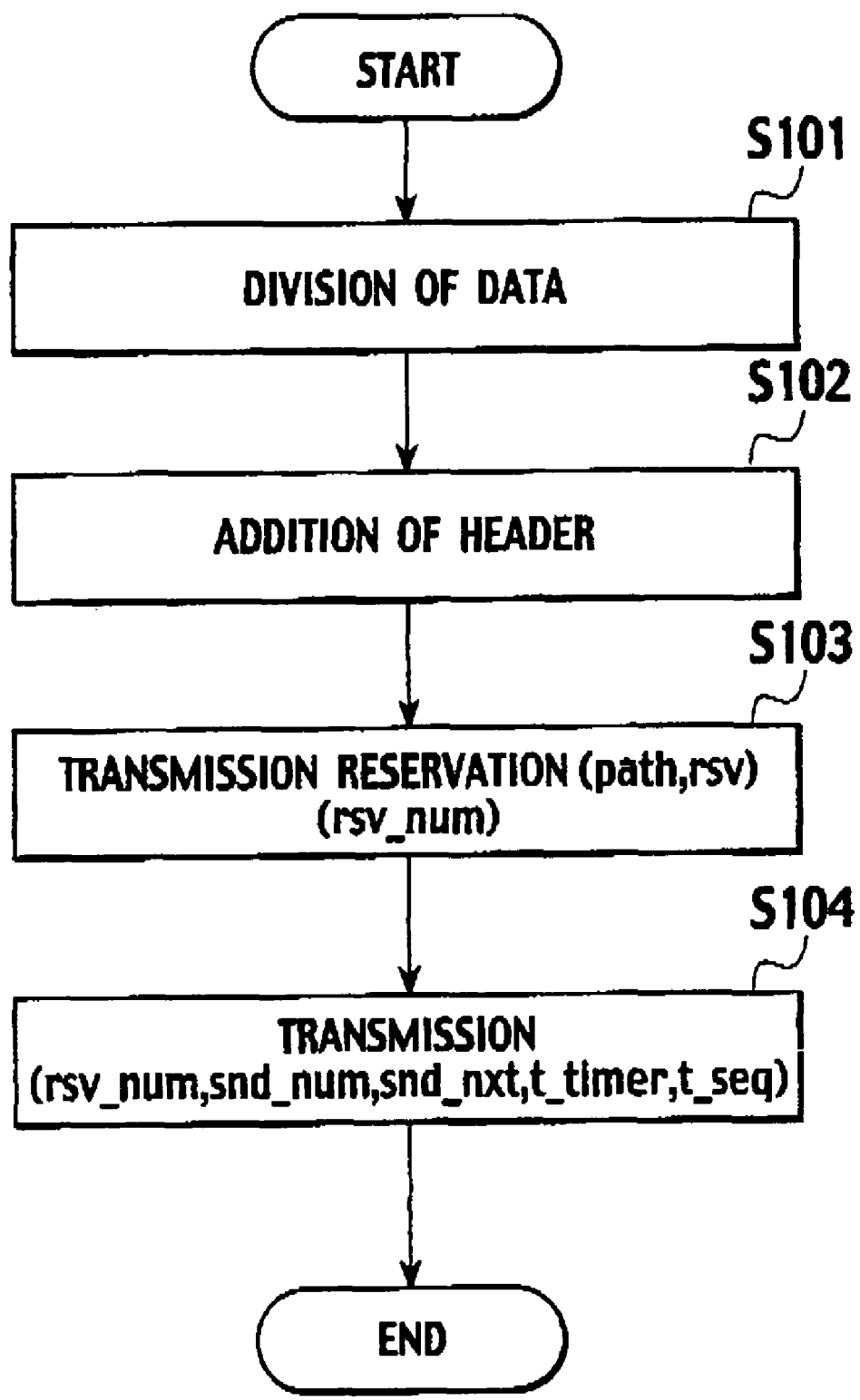
FIG. 8 is a flow chart showing operations in which segments are transmitted by the communication terminal device (the transmitting terminal device) according to the first embodiment of the present invention.

As shown in FIG. 8, in Step S101, the transmission segment manager unit 11 of the transmitting terminal device 10 divides data, received from the application function unit 10a by the MTU unit.

In Step S102, the transmission segment manager unit 11 forms a segment by adding a TCP header to each piece of data divided by the MTU unit, and manages the segment by adding the above-mentioned special header (see FIG. 3).

Here, the transmission segment manager unit 11 sets "0" as an initial value for each variable and flag.

In Step S103, the transmission segment manager unit 11 monitors the variable "rsv_num" in TCP-CB related to all the paths managed by the path information manager unit 12.

When the variable "rsv_num" is smaller than the variable "max_burst", the transmission segment manager unit 11 firstly makes a reservation for transmission of the first data (data shown by the variable "rsv_nxt").

Here, the variable "max_burst" shows the maximum data amount of segments (the maximum number of segments) which can be transmitted at a time upon the receipt of an ACK. Note that the variable "max_burst" is a common variable in all the paths (interfaces).

Subsequently, the transmission segment manager unit 11 makes a reservation for transmission of a segment in which the "rsv" flag is not set, starting from the first data (data shown by the variable "rsv_nxt") of the transmission segment manager unit 11.

The path information manager unit 12 adds the data amount of segments, in which a reservation for transmission has been made, to the variable "rsv_num" in TCP-CB corresponding to paths used for the transmission of the segments.

Incidentally, the reserved segments are combined with the variable "next". Thus, a segment reserved next can be traced by tracing the variable "next" within a special header added to each segment.

Here, when a value is already set to the variable "rsv_num" the transmission segment manager unit 11 makes a reservation only for transmission of segments corresponding to "cwnd-rsv_num".

In other words, the transmission segment manager unit 11 is configured to make a reservation for transmission of a segment in a manner that the variable "rsv_num" is equal to the variable "cwnd".

However, when an advertisement window value in an ACK is smaller than the total (Σcwnd) of the variables "cwnd" managed by all path information manager units #n, the transmission segment manager unit 11 keeps the variable "rsv_num" not exceeding "an advertisement window value in ACK"×"cwnd/Σcwnd".

When having completed such a reservation for the transmission, the transmission segment manager unit 11 sets "1" to the "rsv" flag in the above-mentioned special header, and sets, to the variable "path" in the above-mentioned header, the identification information of a path for which a reservation for the transmission has been made.

Here, when a reservation is made for the transmission of a segment at a point prior to a position set to the variable "snd_nxt", the path information manager unit 12 sets, to the variable "snd_nxt", the starting point of a segment immediately following a segment in which a reservation for the transmission has been made.

When the variable "rcv_nxt" is smaller than the variable "snd_nxt", the path information manager unit 12 similarly sets, to the variable "rcv_nxt", a value set to "snd_nxt".

In Step S104, the segment transmitter unit 13 sequentially transmits, to the receiving terminal device 30, segments in which a reservation for the transmission has been made by simultaneously using the plurality of paths #1 to #3.

Note that when "cwnd"−"snd_num" is larger than 0, the segment transmitter unit 13 performs transmission sequentially from a segment shown by the variable "snd_nxt".

Here, the variable "snd_num" is the number of segments which have been transmitted along the applicable paths and have not received ACKS.

Additionally, when the segment transmitter unit 13 transmits a segment along a specific path, the path information manager unit 12 decreases the data amount of segments transmitted from the variable "rsv_num" in TCP-CB related to the specific path, and adds the data amount of segments transmitted to the variable "snd_num" in TCP-CB related to the specific path.

Every time the segment transmitter unit 13 transmits a segment, the path information manager unit 12 traces the variable "next", and sets the starting point of the next segment to the variable "snd_nxt".

Incidentally, if the variable "t_timer" is not set when the segment transmitter unit 13 transmits a segment, the path information manager unit 12 sets, to the variable "t_timer", a new timeout value calculated from the variable "rtt" and the like, and sets, to the variable "t_seq", the sequence number (seq) of a transmitted segment.

Figure 9:
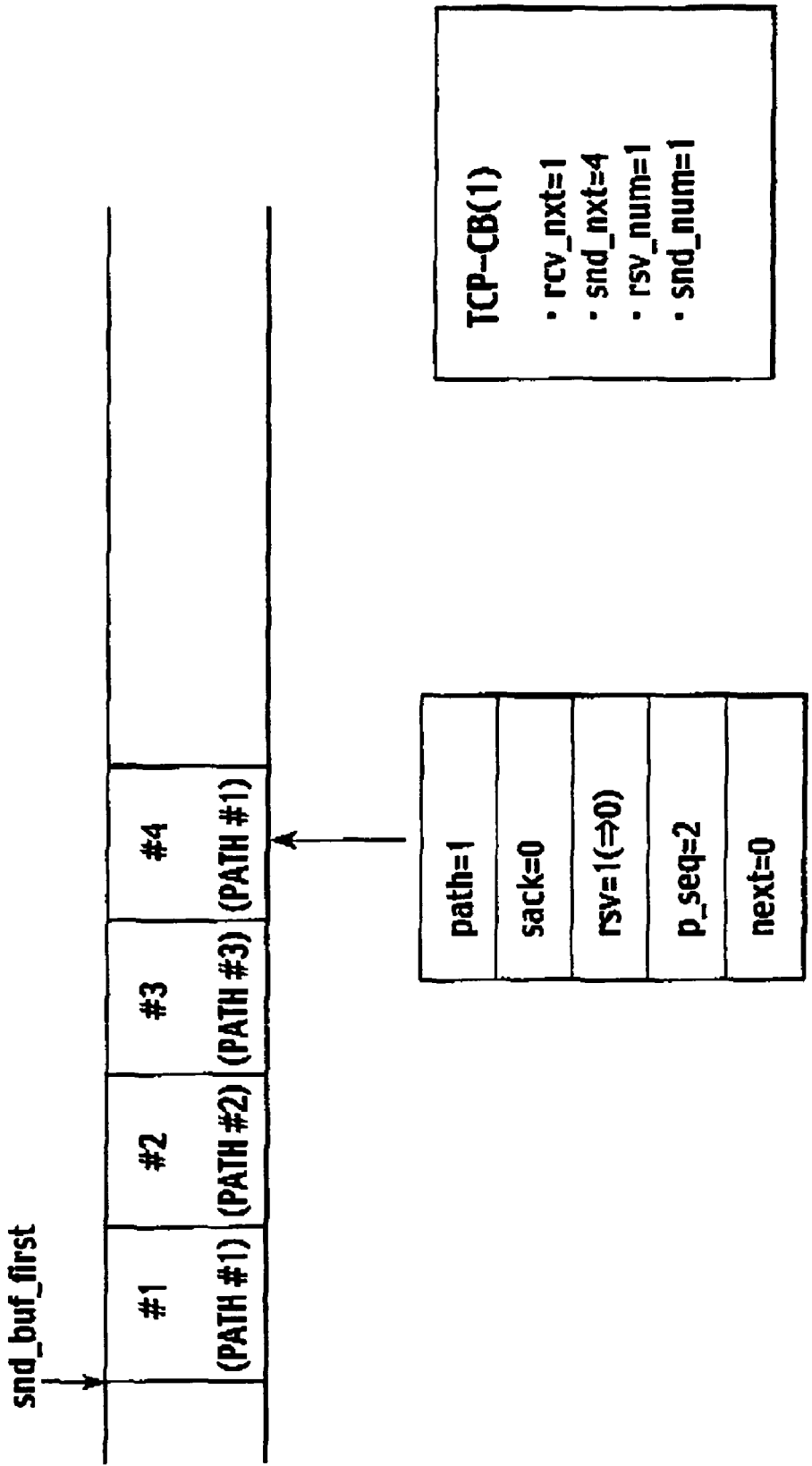
FIG. 9 is a diagram for explaining the operations in which the segments are transmitted by the communication terminal device (the transmitting terminal device) according to the first embodiment of the present invention.

FIG. 9 shows an example of the above-mentioned special header and TCP-CB in a case where the transmitting terminal device 10 transmits a segment #4 along the path #1.

In this case, the settings in a special header added to the segment #4 in the transmission segment manager unit 11 are as follows: the variable "path" is equal to "1", the variable "sack" is equal to "0", the "rsv" flag is equal to "0", and the variable "next" is equal to "0".

In addition, the settings in TCP-CB (1) related to the path #1 are as follows: the variable "rcv_nxt" is equal to "1", the variable "snd_nxt" is equal to "4", the variable "rsv_num" is equal to "1", and the variable "snd_num" is equal to "1".

Secondly, with reference to FIGS. 10 and 11, descriptions will be given of operations where the transmitting terminal device 10 according to this embodiment receives an ACK.

Figure 10:
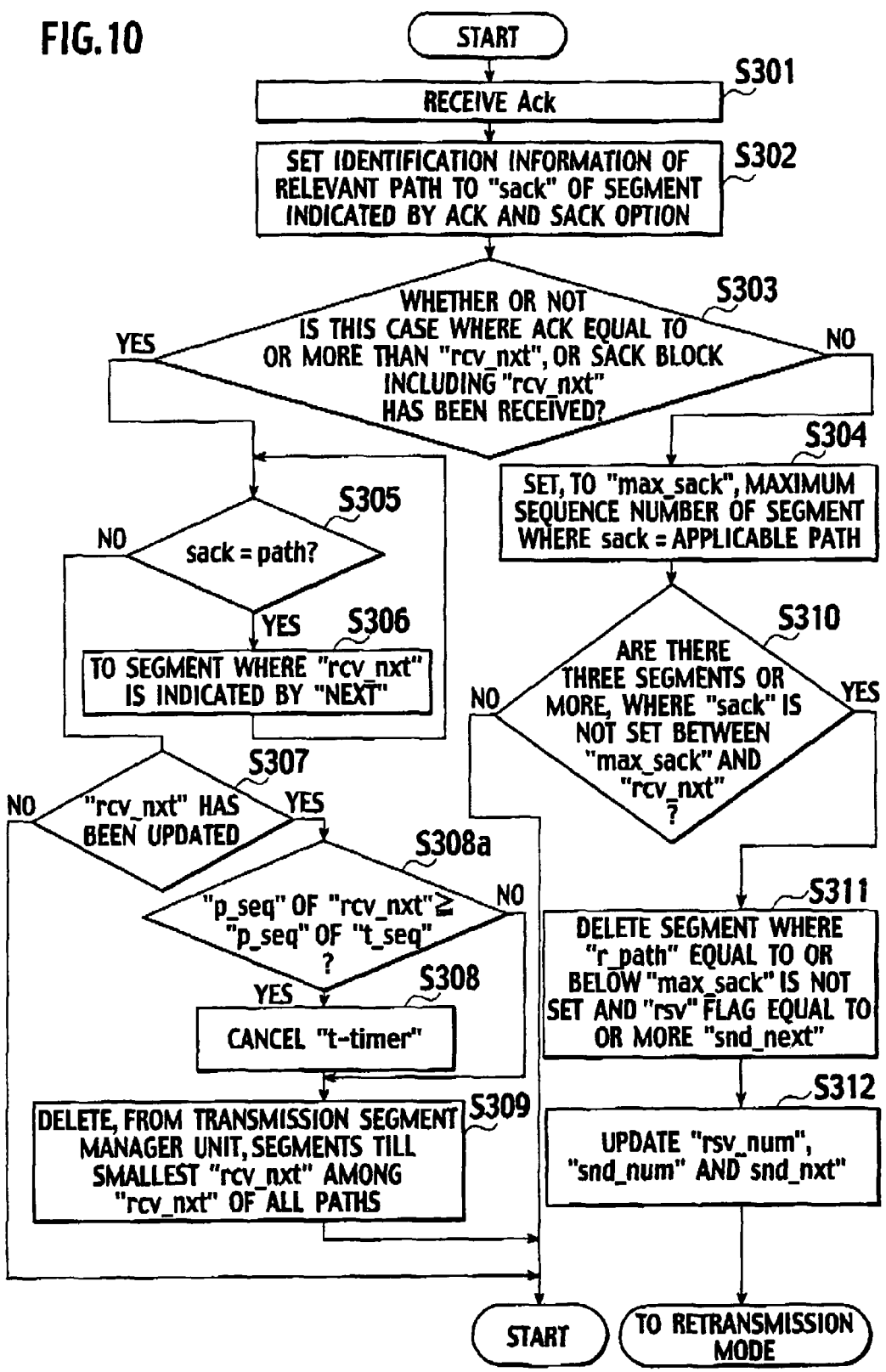
FIG. 10 is a flow chart showing operations in which an ACK is received by the communication terminal device (the transmitting terminal device) according to the first embodiment of the present invention.

As shown in FIG. 10, in Step S301, the segment receiver unit 14 of the transmitting terminal device 10 receives an ACK transmitted from the receiving terminal device 30, and transmits the ACK to an appropriate path information manager unit #n, based on four addresses of [(an IP address of a sender, a port number thereof), (an IP address of a receiver, a port number thereof)] of a path which has received the ACK.

Figure 11:
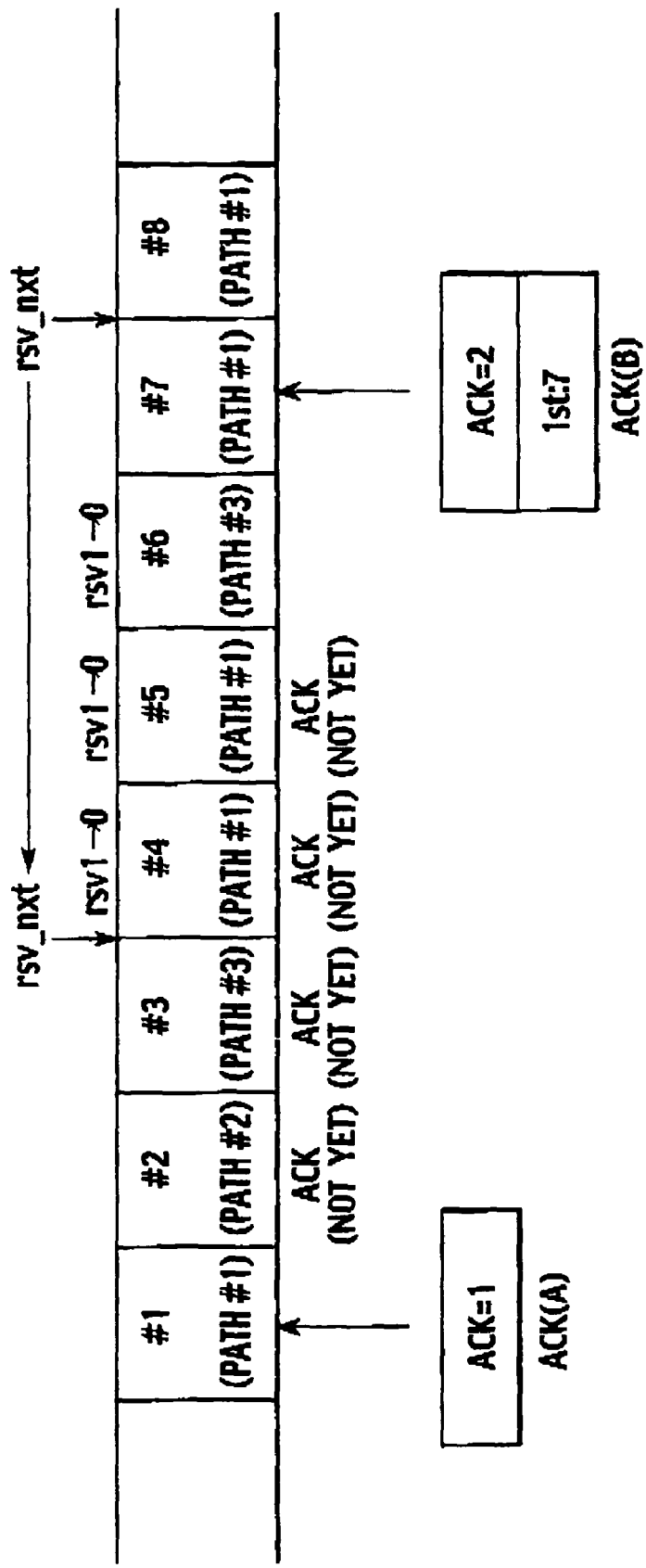
FIG. 11 is a diagram for explaining the operations in which the ACK is received by the communication terminal device (the transmitting terminal device) according to the first embodiment of the present invention.

In an example of FIG. 11, the segment receiver unit 14 of the transmitting terminal device 10 transfers either an ACK (A) or (B) received from the receiving terminal device 30, to the path information manager unit #1 managing the path #1 which has received either of the ACK (A) or (B).

Here, the ACK (A) shown in FIG. 11 is to notify that a segment with the smallest sequence number among segments which have not been received yet is a "segment #1".

Furthermore, the ACK (B) shown in FIG. 11 is to notify that a segment with the smallest sequence number among segments which have not been received yet is a "segment #2", and is to notify that the receipt of a segment #7 by the SACK option has been successful.

Incidentally, an ACK may be configured to notify that a plurality of segments has successfully been received by one SACK option.

In Step S302, a path information manager unit #n instructs the transmission segment manager unit 11 to set the identification information of a path managed by the path information manager unit #n, to the variable "sack" in the special header, with regard to a segment whose arrival on the receiving side has been reported by received ACK and the SACK option.

Note that when the identification information of a path set to the variable "sack" agrees with identification information of a path set to the variable "path", the variable "sack" is not overwritten upon the receipt of other ACKs.

In the example of FIG. 11, the path information manager unit #1 instructs the transmission segment manager unit 11 to set the identification information of the path #1 to the variable "sack" in the special header added to the segment #1 which has been notified of successful receipt by the ACK (A).

Furthermore, in the example of FIG. 11, a path information manager unit #1 instructs the transmission segment manager unit 11 to set the identification information of the path #1 to the variable "sack" in the special header added to the segment #7 which has been notified of a successful receipt by the SACK option of the ACK (B).

In Step S303, a path information manager unit #n compares the variable "rcv_nxt" in the TCP-CB (n) with the sequence number (seq) of a segment notified by the ACK or the SACK option.

When the variable "rcv_nxt" is smaller than the seq (ACK), or when the receipt of a segment corresponding to the variable "rcv_nxt" is not notified by a SACK block, the operation proceeds to Step S304. In other cases, the operation proceeds to Step S305.

Since "the sequence number of the segment #1" is set to the variable "rcv_nxt" in TCP-CB (n) in the example of FIG. 11, when the path information manager unit #1 receives the ACK (A), the operation proceeds to Step S305.

In Step S305, a path information manger unit #n judges whether or not the variable "sack" in a special header related to a segment designated by the variable "rcv_nxt" in the TCP-CB (n) agrees with the variable "path".

In Step 305, when the variable "sack" in the special header related to a segment designated by the variable "rcv_nxt" in the TCP-CB (n) agrees with the variable "path", a segment in which the variable "rcv_nxt" is set is caused to move to the next in accordance with the variable "next" in the TCP-CB (n), in Step S306.

In the case of FIG. 11, the segment #4 is set to the variable "rcv_nxt" by the receipt of the ACK (A) (since the variable "next" in the special header added to the segment #1 indicates a segment to be transmitted next along the path #1).

This process is continued until a segment in which the variable "sack" does not agree with the variable "path" is found.

On the other hand, when a segment in which the variable "sack" does not agree with the variable "path" is found in Step S305, it is judged whether or not the variable "rcv_nxt" has been updated in Step S307.

When the variable "rcv_nxt" has been updated, the variable "t_timer" is canceled in Step S308, and segments till the smallest variable "rcv_nxt" are deleted from the transmission segment manager unit 11 in all the path information manager units in Step S309.

Step S308 is cancelled when the variable "p_seq" of a segment equivalent to the variable "rcv_nxt" exceeds the variable "p_seq" of a segment equivalent to the variable "t_seq" managed by the path information manager unit 12 in Step S308a after Step S307.

On the other hand, Step S309 is always carried out after Step S308 regardless of the presence or absence of Step S308.

On the other hand, when the ACK (B) is received, the operation proceeds to Step S304 in the case of FIG. 11, since the variable "rcv_nxt" in TCP-CB (n) is the segment #4 and the arrival on the receiving side is not reported by the ACK or the SACK option.

Here, the variable "rcv_nxt" has been updated by the receipt of the ACK (A). Although the first block of the SACK option makes a notification of the segment #7, since the segment #4 set to the variable "rcv_nxt" is not included, the operation proceeds to Step S304.

In Step S304, with regard to a segment transmitted along the path, the maximum sequence number of a segment in which the identification information of a path set to the variable "sack" agrees with the identification information of a path set to the variable "path" is set to the variable "max_sack" in the TCP-CB (n).

In the example of FIG. 11, when receiving the ACK (B), the variable "max_sack" in the TCP-CB (n) is set for the segment #7.

Next, in Step S310, the number of segments in which the variable "sack" is not set between the variables "max_sack" and "rcv_nxt" is counted. This calculation can easily be performed by referring to the variables "rcv_nxt", "max_sack" and "p_seq".

When there are three segments of this kind or more, in Step S311, segments equal to or below the variable "max_sack", in which the variable "sack" is not set among segments transmitted from the path, and the "rsv" flags of segments equal to or over the variable "snd_nxt", which has been reserved by the path, are deleted, and a mode is shifted to retransmission (the already reserved segment equal to or over the variable "snd_nxt" means segments which have not been transmitted yet although reservations have been made for the transmission).

In the case of FIG. 11, the "rsv" flags of the segments #4, #5 and #6 are deleted.

At the same time, in Step S312, the variables "rsv_num", "snd_num", and "snd_nxt" are updated in the TCP-CB (n) based on the applicable initialization result.

Note that a mode is shifted to retransmission not only by the receipt of an ACK but also by the expiration of the variable "t_timer". The operation in this case starts from Step S311.

However, in the case of the expiration of the variable "t_timer", a condition regarding a segment which has been equal to or below the variable "max_sack" is changed to a condition regarding a segment which has been equal to or below the variable "snd_nxt", in Step S311.

Thirdly, with reference to FIGS. 11 and 12, descriptions will be given of the operations of a "retransmission mode" of the transmitting terminal device 10 according to this embodiment.

Figure 12:
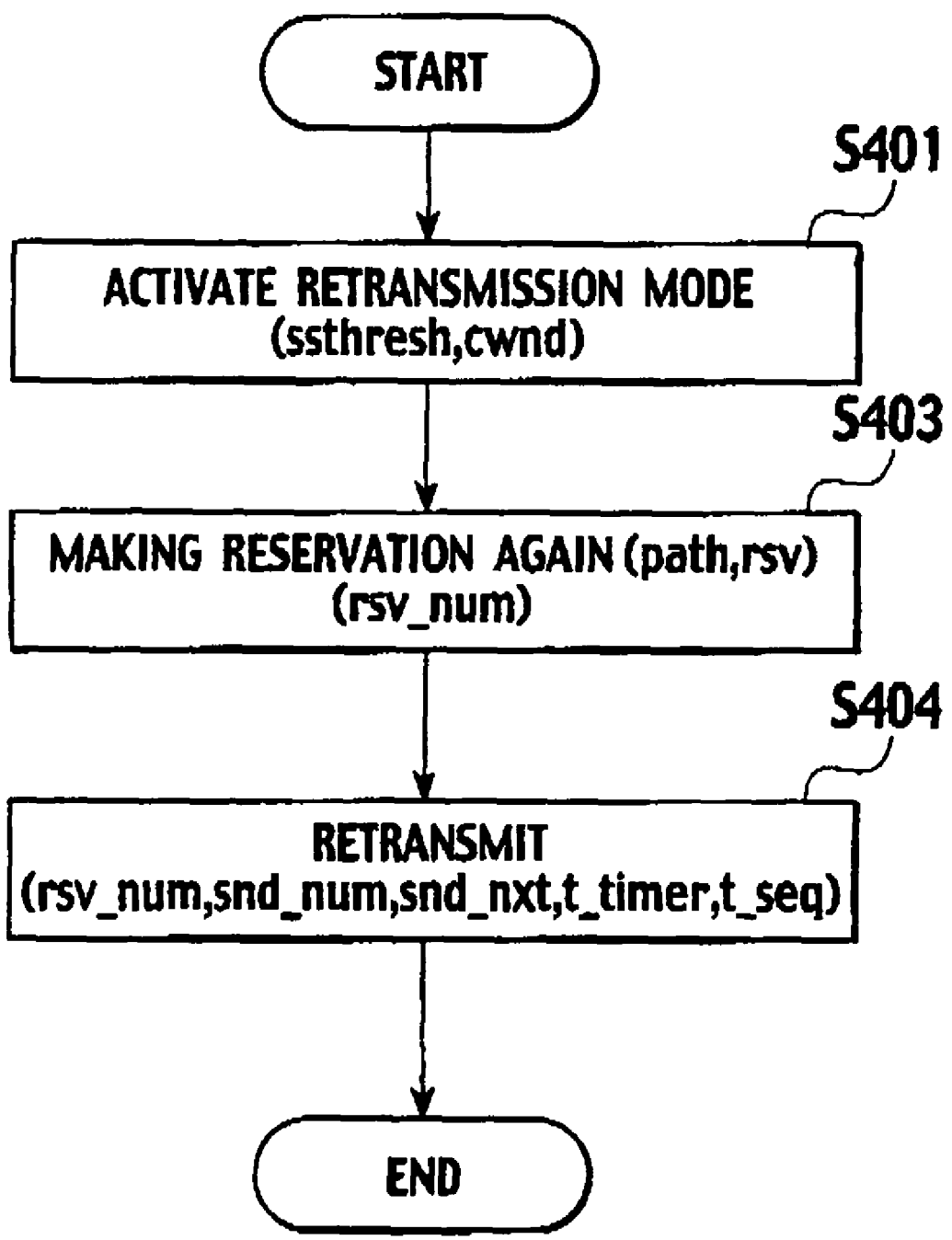
FIG. 12 is a flow chart showing operations of a retransmission mode in the communication terminal device (the transmitting terminal device) according to the first embodiment of the present invention.

As shown in FIG. 12, the "retransmission mode" is activated in the transmitting terminal device 10 in Step 8401.

At this point, a path information manager unit #n sets a half value of the variable "cwnd" in TCP-CB (n) to the variable "ssthresh" while setting the variable "cwnd" to "1".

Incidentally, a path information manager unit #n may be configured to set the variables "cwnd" and "ssthresh", considering the kinds of wireless.

In Step S403, the transmission segment manager unit 11 makes a reservation again for the transmission of the segment, based on TCP-CB (TCP control information) managed by each path information manager unit #n.

Here, when a plurality of paths are used, a reservation for the transmission is made for a path different from the identification information of a path shown by the variable "path" (since a segment is lost in a path shown by the variable "path", if the path is used again, a segment will highly likely be lost again. Thus, a new path is used upon the retransmission of a segment).

Here, the transmission segment manager unit 11 sets the variable "path" and the "rsv" flag in a special header added to a segment in which a reservation for the transmission is made, and updates the variable "rsv_num" in a path information manager unit #n and TCP-CB (n).

In Step 8404, the segment transmitter unit 13 sequentially transmits segments, in which a reservation for the transmission is made, to the receiving terminal device 30 by simultaneously using the plurality of paths #1 to #3, similarly to the above-mentioned operations of Step S104.

Here, when the segment transmitter unit 13 transmits a segment along a specific path, the transmission segment manager unit 11 sets "1" to the "snd" flag in a special header related to the segment, and the path information manager unit 12 decreases the data amount of segments transmitted from the variable "rsv_num" in TCP-CB related to the specific path and adds the data amount of segments transmitted to the variable "snd_num" in TCP-CB related to the specific path.

Every time the segment transmitter unit 13 transmits a segment, the path information manager unit 12 sets, to the variable "snd_nxt", the starting point of a segment having a special header in which "1" is set to the "rsv" flag selected from among segments positioned after the segment.

Note that when the segment transmitter unit 13 transmits a segment, if the variable "t_timer" is not set, the path information manager unit 12 sets, to the variable "t_timer", a new timeout value calculated from the valuable "rtt" and the like and sets the sequence number (seq) of the transmitted segment to the variable "t_seq".

Fourthly, with reference to FIGS. 13 to 15, descriptions will be given of operations in which the receiving terminal device 30 according to this embodiment receives a segment transmitted by the transmitting terminal device 10.

Figure 13:
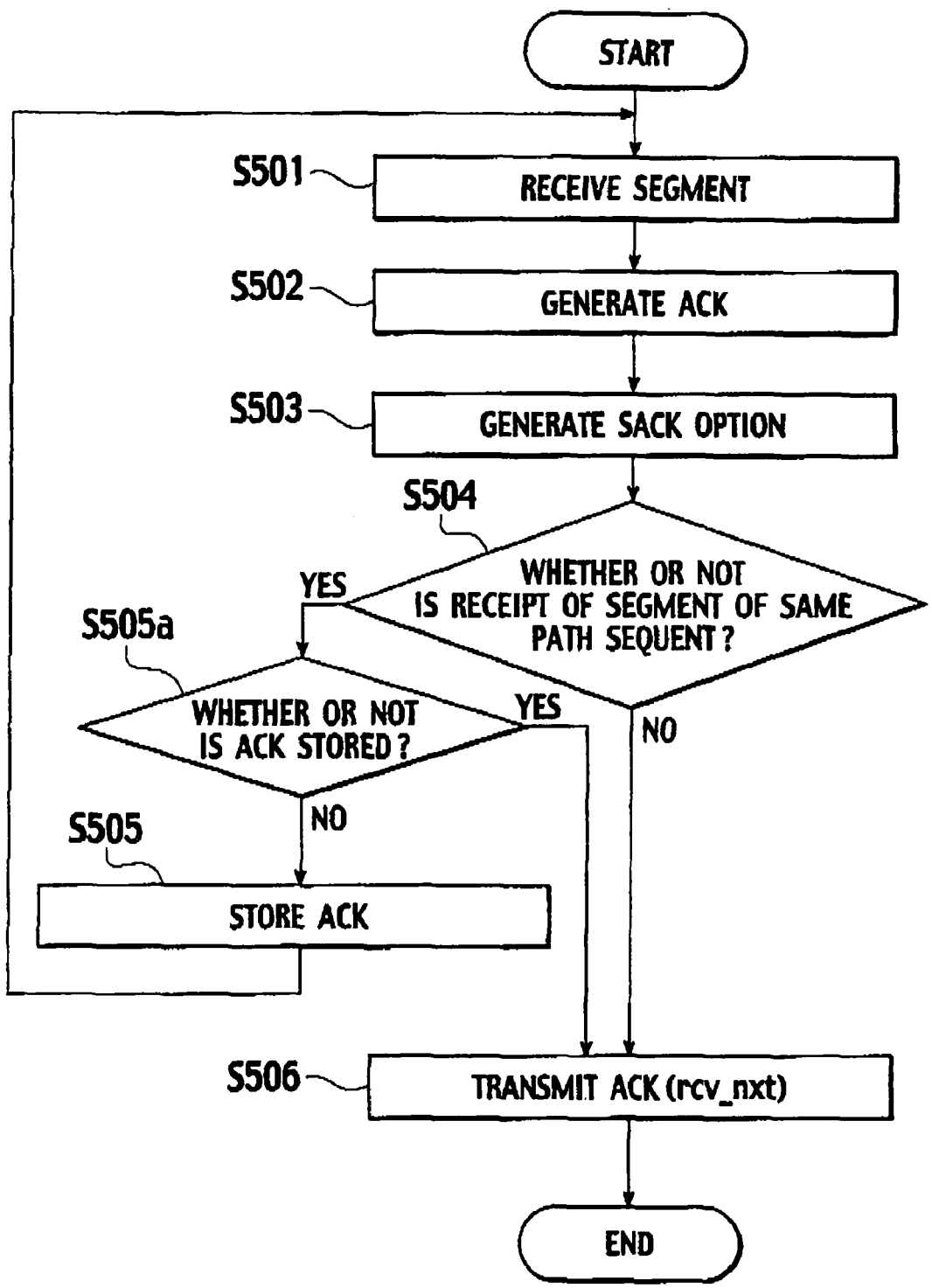
FIG. 13 is a flow chart showing receipt operations in the communication terminal device (the receiving terminal device) according to the first embodiment of the present-invention.

As shown in FIG. 13, in Step S501, the segment receiver unit 31 of the receiving terminal device 30 transfers a received segment to an appropriate path information manager unit in, based on four addresses of [(an IP address of a sender, a port number thereof), (an IP address of a receiver, a port number thereof)] of a path which has received the segment.

Here, the receipt segment manager unit 33 manages a segment transferred from a path information manager unit #n, by adding a special header.

Note that the receipt segment manager unit 33 may be configured to manage the segment in order of the sequence numbers of received segments.

Here, the receipt segment manager unit 33 sets the segment to the variable "next" of the special header of a segment received immediately before the segment along the path, in a special header added to the segment.

The segment transmitter unit 34 generates an ACK for the segment received by the receipt segment manager unit 33 in Step S502, and generates a SACK option in order to add to the ACK in Step S503.

Here, the first block in the SACK option shows a block including a segment received this time.

The second block in the SACK option shows a segment received in a previous time along the same path as the path used receiving the segment this time.

The third block in the SACK option shows a segment received immediately before the previous time along the same path as the path used in receiving the segment this time.

Figure 14:
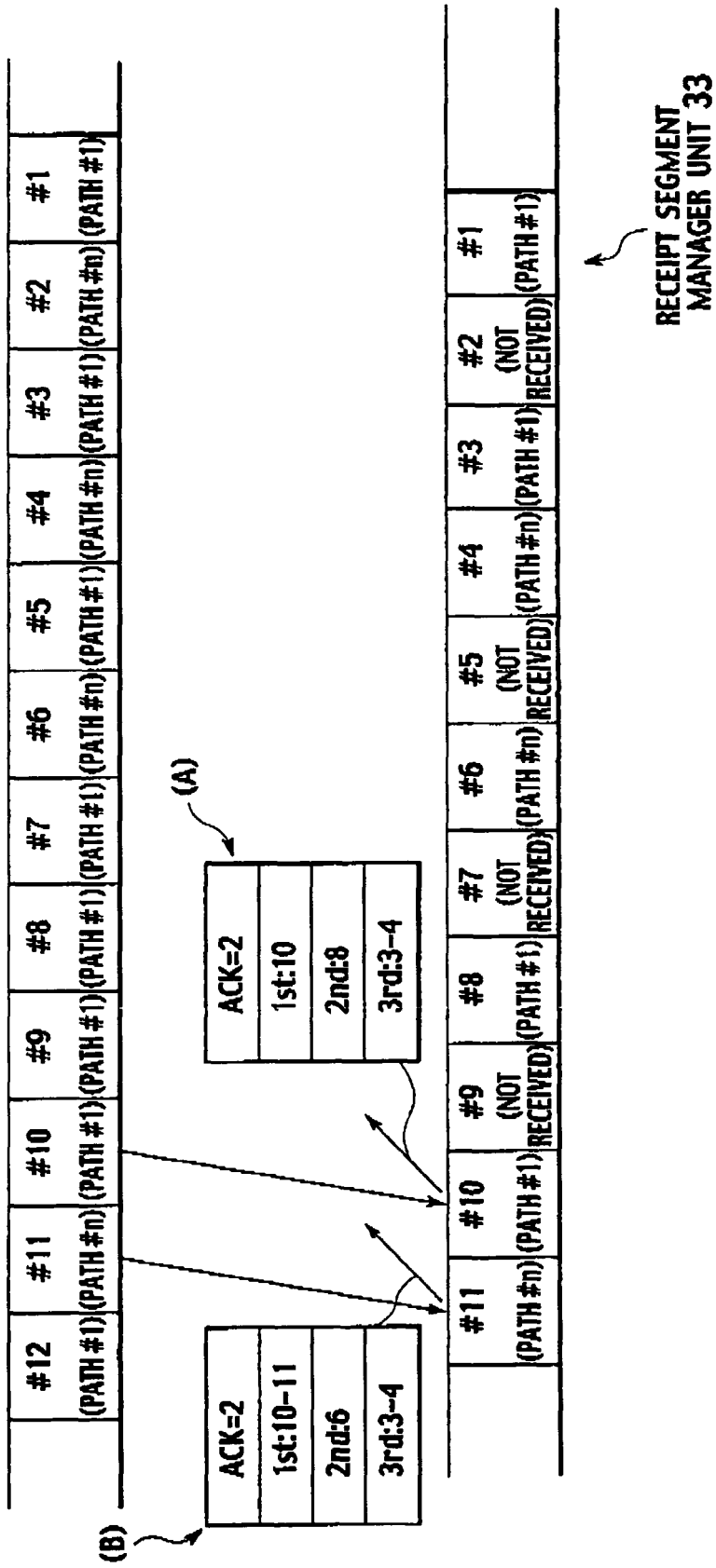
FIG. 14 is a diagram for explaining the receipt operations in the communication terminal device (the receiving terminal device) according to the first embodiment of the present invention.

In a case of FIG. 14, in the SACK option added to the ACK (A) generated when a segment #10 is received along the path #1, the "identification information of the segment #10" is set in the first block, and the "identification information of a segment #8" is set in the second block, and the "identification information (3-4) of the segments #3 and #4" is set in the third block.

Incidentally, in such a case in the third block in the conventional SACK option, the "identification information of the segment #6" is set.

Moreover, in the case of FIG. 14, in the SACK option added to the ACW (B) generated when a segment #11 is received along a path #n, the "identification information (10-11) of the segments #10 and #11" is set in the first block, the "identification information of the segment #6" is set in the second block, and the "identification information (3-4) of the segments #3 and #4" is set in the third block.

Incidentally, in such a case in the conventional SACK option, the "identification information of the segment #8" is set in the second block and the "identification information of the segment #6" is set in the third block.

In Step S504, a path information manager unit #n judges whether or not the receipt of segments along the same path is serial by referring to the variable "rcv_nxt". When it is serial, the operation proceeds to Step S505. When it is not serial, the operation proceeds to Step S506.

In Step S505, a path information manager unit #n: sets, to the variable "rcv_nxt", the identification information of a segment immediately following the received segment, in TCP-CB (n); sets, to the variable "del_ack", the identification information of a segment (a segment with the smallest sequence number among segments which have not been received) to be notified by the ACK generated in Step S502; and sets, to the variables "p_sack 1 to 3", the identification information of a segment notified by each block of the SACK option generated in Step S503.

In addition, a path information manager unit #n activates the variable "del_timer" in TCP-CB (n).

If no segment is newly received during a period of time that the variable "del_timer" is expired, the value of the variable "del_ack" is returned (if a segment is newly received, the variable "del_timer" is canceled).

Before proceeding to Step S505, it is judged whether or not an ACK is stored, in Step S505a. When stored, the operation moves to Step S506. When not stored, the operation moves to Step S505.

In Step S506, the segment transmitter unit 34 generates and transmits an ACK based on the variables "p_sack 1 to 3" in TCP-CB (n). In such a case, a path information manager unit #n updates the variable "rcv_nxt" in TCP-CB (n) as appropriate.

Figure 15:
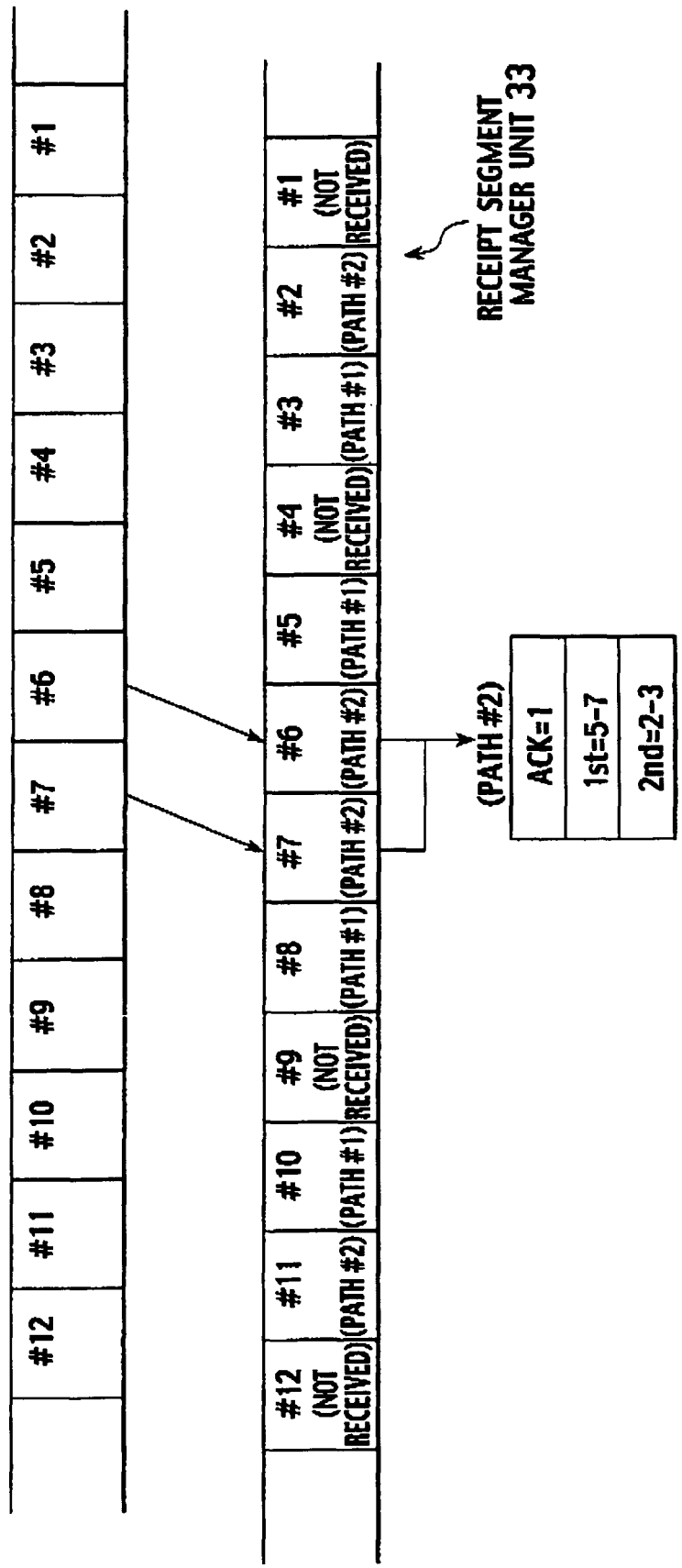
FIG. 15 is a diagram for explaining the receipt operations in the communication terminal device (the receiving terminal device) according to the first embodiment of the present invention.

In a case of FIG. 15, the segment transmitter unit 34 serially receives the segments #6 and #7 along the same path #2. Thus, the segment transmitter unit 34 is configured to notify the successful receipt of the segments #6 and #7 by not two ACKs but one ACK.

Operation and Effects of Communication Terminal Devices According to First Embodiment of Present Invention Since the communication terminal device according to this embodiment is configured to transmit a segment by using a normal TCP header alone, it is possible to carry out communications even with the receiving terminal device 30 to which the techniques related to the present invention are not applied.

Since the communication terminal device according to this embodiment can transmits ACKs along a plurality of paths, it is possible to measure RTT accurately and perform control over each path, the control being equivalent to a normal TCP control.

Since the communication terminal device according to this embodiment can transmit a plurality of ACKs (receipt acknowledgement signals) collectively (for example, since it is possible to support C-ACK), it is possible to decrease the number of ACKs to be transmitted.

Since the communication terminal device according to this embodiment is configured to transmit an ACK to a path which has received a packet, it is possible to measure RTT accurately and to perform control over each path, the control being equivalent to a normal TCP control, by improving C-ACK.

First Modification Example

Figure 16:
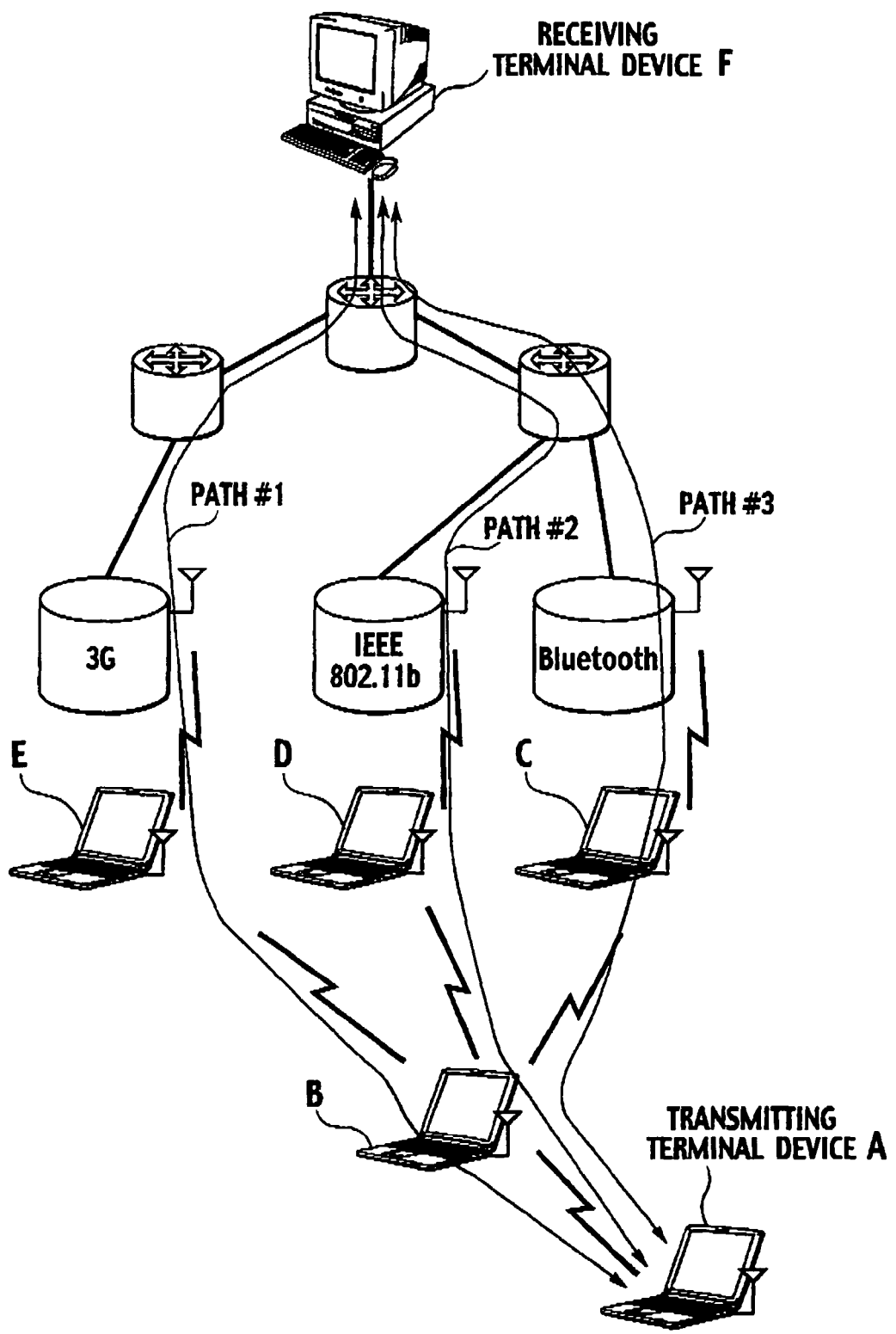
FIG. 16 is a diagram for explaining communication terminal devices according to a first modification example of the present invention.
Figure 17:
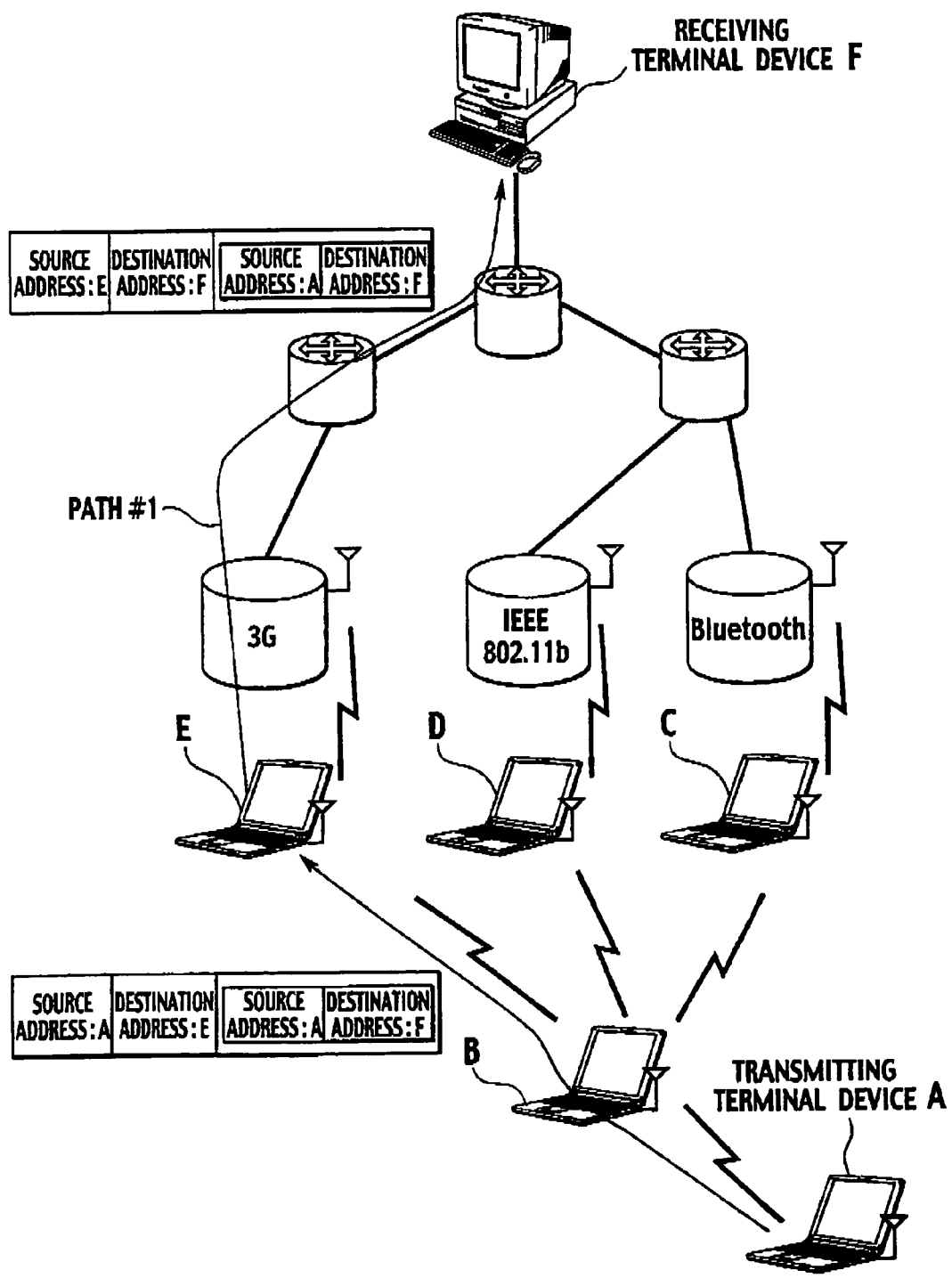
FIG. 17 is another diagram for explaining the communication terminal devices according to the first modification example of the present invention.

With reference to FIGS. 16 and 17, descriptions will be given of a first modification example of the present invention.

As shown in FIG. 16, a segment receiver unit 13 of a transmitting terminal device A according to the first modification example is configured to form an ad hoc network among itself and neighboring communication terminal devices B to E, and to transmit segments along paths #1 to #3 in the ad hoc network.

Note that the transmitting terminal device A is required to previously know about the terminal devices C to E to be gateways to a fixed network, by using techniques cited in a thesis "A hybrid Approach to Internet Connectivity for Mobile Ad Hoc Networks (written by P. Ratanchandani and R. Kravests, Proceedings of IEEE WCNC, 2003)", a thesis "Internet Connectivity for Ad Hoc Networks (written by Y. Sun, E. Belding-Royer and C. Perkins, International Journal of wireless Information Networks, special issue on Mobile Ad Hoc Networks (MANETs): Standards, Research, Applications, 9(2), April 2002)" and the like.

As shown in FIG. 17, assumed is a case where the transmitting terminal device A transmits a segment destined to the receiving terminal device F by using a first packet including a first header in which, via the path #1, the "address of a transmitting terminal device F" is set as a destination address and the "address of the receiving terminal device A" is set as a source address.

Firstly, the transmitting terminal device A transmits, to the terminal device E, a second packet which is the first packet encapsulated by a second header in which the "address of the transmitting terminal device E" is set as a destination address and the "address of the receiving terminal device A" inset as a source address.

Secondly, the terminal device E transmits, to the receiving terminal device F, a third packet, which is the first packet contained in the received second packet, encapsulated again by a third header in which the "address of the transmitting terminal device F" is set as a destination address and the "address of the receiving terminal device E" is set as a source address.

Thirdly, the receiving terminal device F identifies a path along which the segment has been transmitted, based on the header of the third packet.

In the case of FIG. 17, the receiving terminal device F can identify paths F→E→A, by referring to the first and third headers.

Note that a segment transmitter unit 34 of the receiving terminal device F according to the first modification example, as well, may be configured to form an ad hoc network among itself and neighboring communication terminal devices, and to receive the segment along the path in the ad hoc network, in a similar manner to the segment transmitter unit 13 of the transmitting terminal device A according to the first modification example.

The communication terminal devices according to this embodiment can realize communications by simultaneously using a plurality of paths which exist between transmitting and receiving terminal devices (that is, a multi-home connection) even in a communication terminal device which does not have a plurality of interfaces, by using paths in an ad hoc network formed with neighboring communication terminal devices.

Furthermore, if a receiving terminal device is provided with a "Mobile IP" function defined in RFC3775 even if not being provided with a function corresponding to the above-mentioned first modification example, when a transmitting terminal device transmits a segment by use of a packet, it is made possible to operate an interface to which an ACK is returned by adding binding update (BU) to an address corresponding to an interface which has transmitted the packet.

Moreover, it is made possible for a segment receiver unit 14 to transmit a received ACK to an appropriate path information manger unit #n, by referring to a first block of the SACK option.

Therefore, it is made possible to enjoy merits similar to a case where the receiving terminal device includes a function corresponding to the above-mentioned first modification example.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A communication terminal device capable of transmitting data to a receiving terminal device by simultaneously using respective ones of a plurality of paths, comprising:
  a path information manager unit configured to manage TCP control information related to each of the respective ones of the plurality of paths;
  a transmission segment manager unit configured to store segments generated by dividing data to be simultaneously transmitted to the receiving terminal device along the respective ones of the plurality of paths; and
  a segment transmitter unit configured to extract a segment from the stored segments and to transmit the extracted segment to the receiving terminal device along the path associated with the extracted segment, wherein
  the transmission segment manager unit is configured to make a reservation for transmission of the extracted segment based on the TCP control information by storing the extracted segment in association with a path used for the transmission of the extracted segment, wherein
  the transmission segment manager unit is configured to cancel reservations for transmission of segments which have not received a receipt acknowledgement signal and which have a sequence number not larger than the largest sequence number among sequence numbers representing segments having received a selective receipt acknowledgement signal and segments which have not been transmitted, when there are a predetermined number of segments or more having not received a receipt acknowledgement signal between a segment which has received the selective receipt acknowledgement signal and which has the largest sequence number, and a segment which should receive a receipt acknowledgement signal next, and to make reservations again for the transmission of the segments based on the TCP control information.

2. The communication terminal device according to claim 1, comprising:
  a segment receiver unit configured to delete, from the transmission segment manager unit, segments each having a sequence number smaller than the smallest sequence number among sequence numbers respectively representing segments which have not received a receipt acknowledgement signal in all the transmission segment manager units, when a receipt acknowledgement signal related to a segment is received along the same path as a path used for transmission of the segment.

3. The communication terminal device according to claim 1, wherein:
when a timeout is detected, the transmission segment manager unit is configured to cancel reservations for transmission of all segments which have not received a receipt acknowledgement signal, and to make reservations again for the transmission of the segments based on the TCP control information.

4. The communication terminal device according to claim 1, wherein
the segment transmitter unit transmits the extracted segments corresponding to data of a single application along the respective ones of a plurality of paths, and
communication is performed in accordance with transmission control protocol (TCP) between the communication terminal device capable of transmitting data and the receiving terminal device.

5. The communication terminal device according to claim 1, wherein the segment transmitter unit is configured to form an ad hoc network among itself and neighboring communication terminal devices, and to transmit the segment along the path in the ad hoc network.

6. A communication terminal device capable of receiving data from a transmitting terminal device by simultaneously using respective ones of a plurality of paths, comprising:
a path information manager unit configured to manage TCP control information related to each of the respective ones of the plurality of paths;
a segment receiver configured to receive, along the plurality of paths, simultaneously transmitted segments, which are generated by dividing the data, along the respective ones of the plurality of paths;
a receipt segment manager unit configured to store the received segments for each of the respective plurality of paths along which the segments have been simultaneously transmitted; and
a segment transmitter unit configured to transmit receipt acknowledgement signals respectively for notifying results of receiving the segments along the respective ones of the plurality of paths based on the TCP control information, wherein
the transmitting terminal device is configured to cancel reservations for transmission of segments which have not received a receipt acknowledgement signal and which have a sequence number not larger than the largest sequence number among sequence numbers representing segments having received a selective receipt acknowledgement signal and segments which have not been transmitted, when there are a predetermined number of segments or more having not received a receipt acknowledgement signal between a segment which has received the selective receipt acknowledgement signal and which has the largest sequence number, and a segment which should receive a receipt acknowledgement signal next, and to make reservations again for the transmission of the segments based on the TCP control information.

7. The communication terminal device according to claim 6, wherein the receipt acknowledgement signal is configured to notify the sequence number of a segment which is successfully received along the path.

8. The communication terminal device according to claim 6, wherein, when the plurality of segments whose sequence numbers are serial have been received along the same path, the receipt acknowledgement signal is configured to collectively notify the results of receiving the plurality of segments.

9. The communication terminal device according to claim 6, wherein the segment receiver unit is configured to form an ad hoc network among itself and neighboring communication terminal devices and to receive the segment along the paths in the ad hoc network.

10. The communication terminal device according to claim 6, wherein
the segment receiver receives the segments corresponding to data of a single application along the respective ones of a plurality of paths, and
communication is performed in accordance with transmission control protocol (TCP) between the communication terminal device capable of transmitting data and the receiving terminal device.

11. A communications method in which a transmitting terminal device transmits data to a receiving terminal device by simultaneously using a plurality of paths, comprising:
making, at the transmitting terminal device, a reservation for transmission of a plurality of segments generated by dividing the data, the plurality of segments being simultaneously transmitted to the receiving terminal device, by storing the plurality of segments in association with respective ones of a plurality of paths used for the transmission of the plurality of segments in a transmission segment manager unit, the reservation being made based on TCP control information managed for each of the respective ones of the plurality of paths;
extracting, at the transmitting terminal device, a segment from the plurality of segments stored in the transmission segment manager unit;
transmitting the extracted segment to the receiving terminal device along a respective one of the path associated with the extracted segment;
managing, at the receiving terminal device, a received segment in association with the respective path along which the segment has been transmitted;
transmitting, from the receiving terminal device, a receipt acknowledgement signal for notifying a result of receiving the segment along the respective path, the transmitting the receipt acknowledgement signal being based on TCP control information managed for each of the respective one of the plurality of paths;
deleting, at the transmitting terminal device, the transmitted segment and the respective path associated with the transmitted segment from the transmission segment manager unit, when the receipt acknowledgement signal related to the transmitted segment has been received along the same respective path as the path used for the transmission of the transmitted segment;
canceling, at the transmitting terminal device, reservations for transmission of segments which have not received a receipt acknowledgement signal and which have a sequence number not larger than the largest sequence number among sequence numbers representing segments having received a selective receipt acknowledgement signal and segments which have not been transmitted, when there are a predetermined number of segments or more having not received a receipt acknowledgement signal between a segment which has received the selective receipt acknowledgement signal and which has the largest sequence number, and a segment which should receive a receipt acknowledgement signal next; and
making reservations again for the transmission of the segments based on the TCP control information.

12. The communications method according to claim 11, further comprising:

forming, at the transmission and receiving terminal devices, an ad hoc network among themselves and neighboring communication terminal devices, wherein the transmitting terminal device transmits the generated segments to the receiving terminal device along the paths in the ad hoc network, and the receiving terminal device receives the segments along the paths in the ad hoc network.

13. The communications method according to claim 11, wherein the transmitting the extracted segments includes transmitting the extracted segments corresponding to data of a single application along the respective ones of a plurality of paths, receiving the extracted segments corresponding to data of a single application along the respective ones of a plurality of paths transmitted, and performing communication in accordance with transmission control protocol (TCP) between the transmitting terminal device and the receiving terminal device.

\* \* \* \* \*